July 4, 1950  R. R. RANEY ET AL  2,513,967
AUTOMATIC WIRE TIER FOR BALERS
Filed Dec. 26, 1947  6 Sheets-Sheet 6

FIG. 17.

INVENTORS
RUSSELL R. RANEY
JAMES H. BORNZIN

ATTY.

Patented July 4, 1950

2,513,967

UNITED STATES PATENT OFFICE 2,513,967

AUTOMATIC WIRE TIER FOR BALERS

Russell R. Raney, La Grange, and James H. Bornzin, Chicago, Ill., assignors to International Harvester Company, a corporation of New Jersey Application December 26, 1947, Serial No. 793,910

8 Claims. (Cl. 100—20)

This invention relates to a new and improved automatic wire tier for balers and has for one of its principal objects the provision of means for encircling a strand of wire about a formed bale and twisting the ends of the wire in such a manner as to securely hold the bale in its formed shape.

An important object of this invention is to provide means for encircling a precompressed bale of material with a strand of wire in combination with means for holding and shearing the encircled strand and separate means to twist the ends of the bale-encircling strand of wire.

Another important object of this invention is the provision of means to extend a tie strand around a bale of material, grip the ends of the tie strand, intertwist the ends of the tie strand on a twister hook, and finally strip the intertwisted ends from the twister hook.

Another important object of this invention is to provide a rotor member adapted to receive, grip and cut bale-encircling wires in various positions of its rotating movement, and twister means operating in conjunction with the member to twist the bale strand ends after they have been released and cut by the rotor.

A still further important object of this invention is to provide a baling machine adapted to compress material into a bale form and, upon attaining some predetermined size, to automatically encircle the bale with a tying strand, and to complete the tying of the strand while commencing encircling of a succeeding bale being formed without interference therewith.

Another and still further important object of this invention is the provision of a baling machine in which there is a definite relationship in the cycle of operation of the bale-compressing plunger, the strand-encircling needle, the strand holding and severing device, and the twister hook.

A further object of this invention is the provision of a wire tying mechanism in which there is employed a single cutting and clamping member.

Other and further important objects of this invention will become apparent from the disclosures in the following specification and accompanying drawings, in which.

As shown in the drawings.

Figure 1:
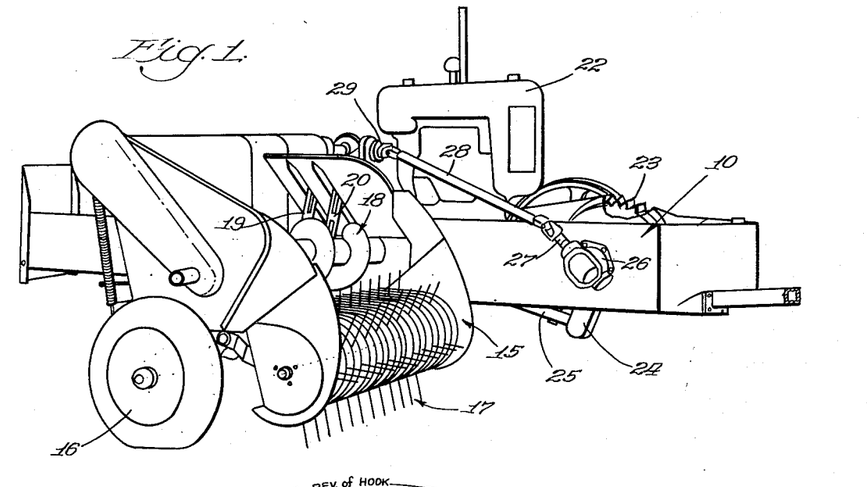
Figure 1 is a perspective view of the baler employing the automatic wire tier of this invention.
Figure 2:
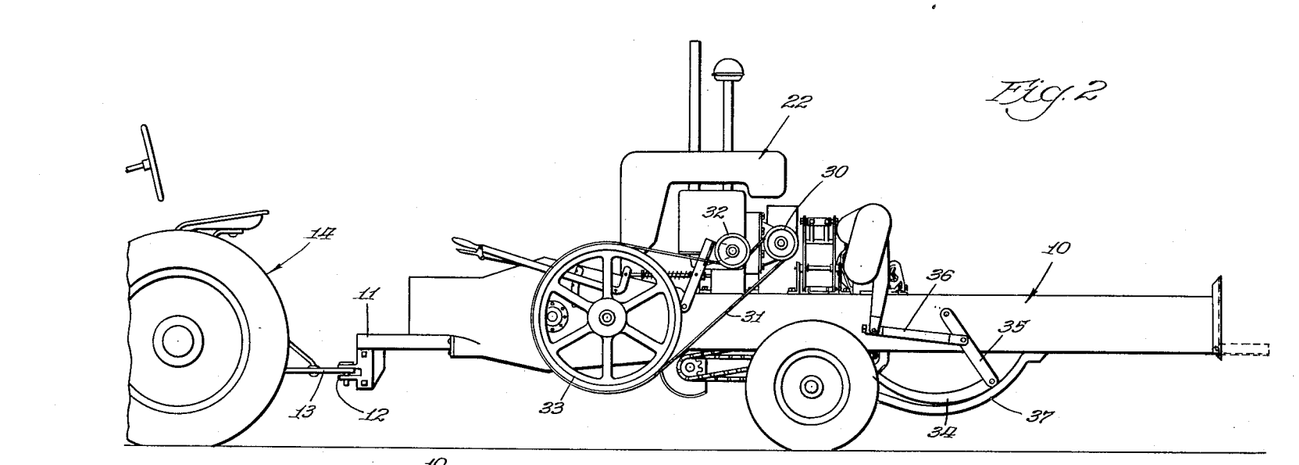
Figure 2 is a side elevational view of the baler shown in Figure 1.
Figures 3, 10:
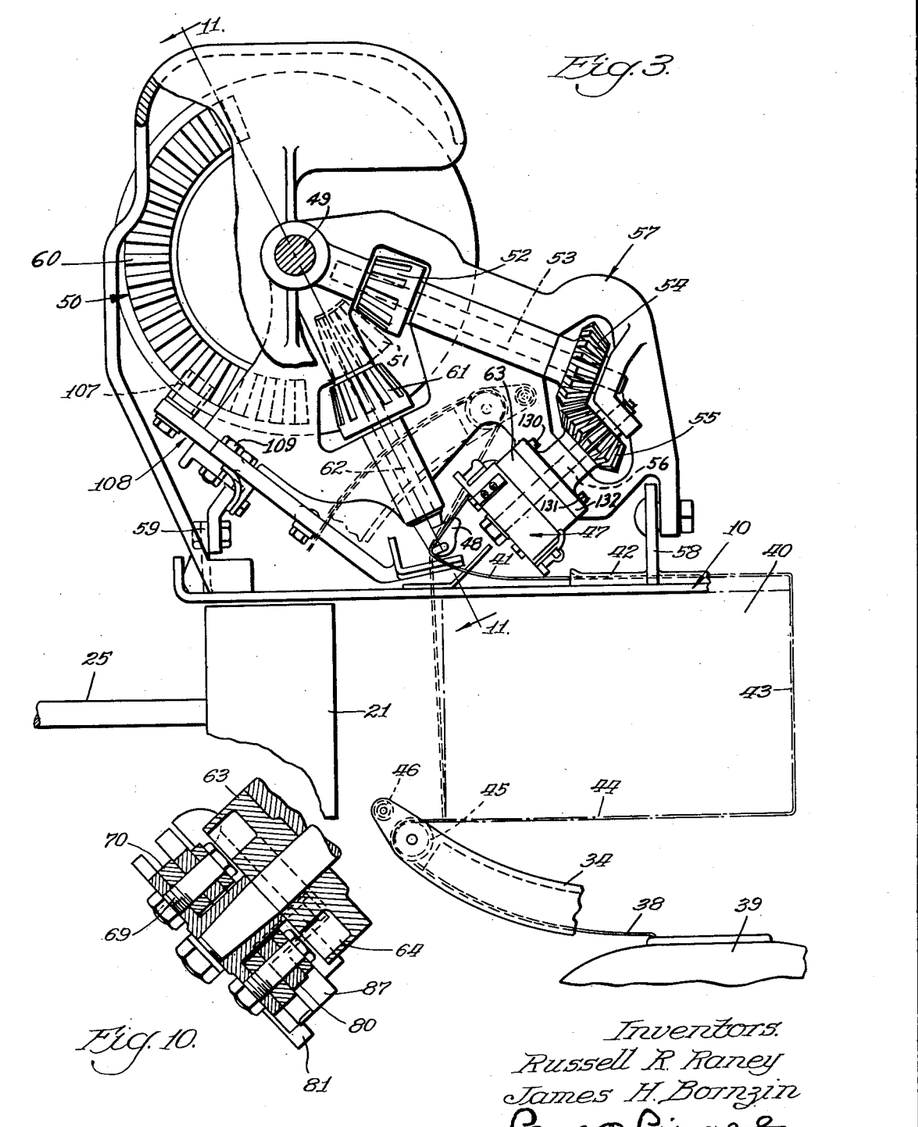
Figure 3 is a side elevational view partially in section of a portion of the baler showing the wire twisting and operating mechanisms therefor.
Figure 10 is a sectional view taken on the line 10—10 of Figure 9.

The reference numeral 10 indicates generally an elongated bale forming chamber extending in a generally longitudinal direction. The forward end of the bale chamber 10 houses the plunger driving elements and is supported by a forwardly extending hitch member 11 having a clevis 12 engaging a draw-bar 13 of a pulling tractor 14. As shown in Figure 1 the baling machine of this invention, in addition to the longitudinally extending bale forming chamber, has a transversely extending hay or material pick-up member 15 supported at its outer end by a wheel 16. The pick-up device 15 includes a rotary pick-up member 17 adapted to pick up hay or straw from a windrow and throw it upwardly and rearwardly into an auger feed member 18 which feeds the material laterally to a position adjacent the bale forming chamber 10. A pair of gyrating packing arms 19 and 20 receive the material from the auger 18 and carry it through an opening in the side wall of the bale forming chamber 10. A plunger 21 as shown in Figure 3 is adapted to reciprocate in the chamber 10 and compress material fed to the chamber through the side opening (not shown). An engine 22 is mounted on top of the chamber 10 and is adapted to impart deciprocating drive to the plunger 21 through the medium of a large gear 23 having a crank arm 24 carrying the piston rod 25 of the plunger 21. The elements on the pick-up device 15, particularly the cylinder pick-up 17, the auger 18, and the packing arms 19 and 20, are driven by the engine 22 through a gear box 26 and a plurality of drive shafts 27, 28, and 29. The details of these driving mechanisms are shown more particularly in copending application entitled Pick-Up Baler, Serial No. 466,460, and filed November 21, 1942, and which issued as Patent 2,450,082, dated September 28, 1948. As shown in Figure 2, the engine 22 drives a power take-off pulley 30 and by means of a belt 31 and an idler pulley 32 imparts rotational drive to a large flywheel 33.

A strand carrying needle 34 is arcuately shaped and is adapted to be moved upwardly through the bale chamber by means of the arm 35 driven by a crank 36 which derives its power from the engine 22. A guide shield 37 forms a track for the arcuate needle 34. As shown in Figure 3 the needle 34 carries a strand 38 of wire or other tie material which is dispensed from a container 39 housing a coil of the wire used.

Figure 7:
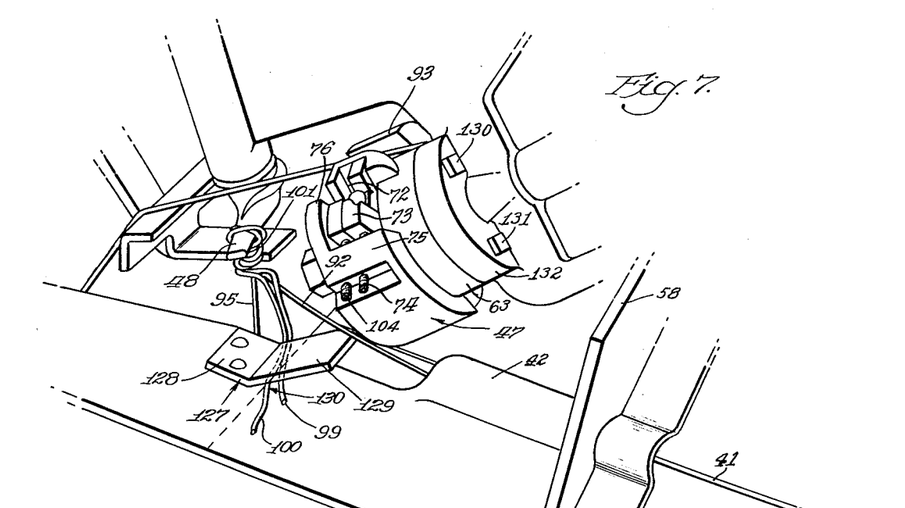
Figure 7 is a perspective view similar to Figures 4 and 6 in which the needle has been retracted and the tie is substantially completed by the twister hook.

In order to commence operation of the baler, it is necessary to secure an end of the wire on the upper side of the bale chamber whereupon charges of material to be baled force the wire rearwardly in the chamber 10 around the front end of the bale 40. The wire held on the top side of the bale chamber is designated by the numeral 41 and extends through a guide member or raised portion 42 in the top side of the bale chamber 10 and thereupon downwardly over the forward end of the bale as designated by the numeral 43 and rearwardly as shown by the numeral 44 and around a sheave 45 in the end of the needle 34. The raised wire guiding portion 42 is best shown in Figure 7. The strand of wire is confined in the end of the needle by a small sheave 46 at the extreme end of the needle 34 and spaced away from the sheave 45 to allow the strand of wire to pass therethrough. When the bale reaches a predetermined length the needle is actuated and is moved upwardly through the bale chamber carrying a double connected portion of a strand over the rear of the formed bale in timed relationship with the receding plunger 21. Movement of the needle 34 upwardly to the top of the bale chamber 10 causes the wire 38 to completely encircle the bale 40, and by means of a holding rotor 47 and a twister hook 48 a tie twist is applied to the encircled wire ends to hold the bale firm in its compact shape.

Figure 17:
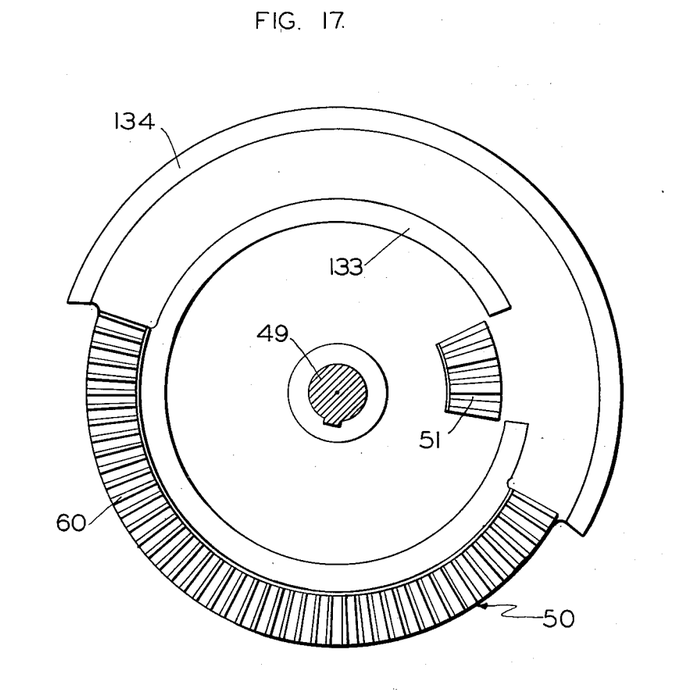
Figure 17 is a front elevational detail of the large bevel gear of Figure 3.

A shaft 49 as shown in Figure 3 receives rotation from the engine 22 and drives a large mutilated bevel gear 50. The gear 50 has an inner arcuate bevel gear track 51 which is engaged by a bevel gear 52. The mutilated or non-toothed portion of this gear 51 is shown at 133 in Fig. 17. The gear 52 is mounted on a shaft 53 having a bevel gear 54 at the other end thereof. The bevel gear 54 meshes with a bevel gear 55. The gear 55 is mounted on a shaft 56 which directly drives the moving parts of the strand holding and cutting rotor 47. The shafts 53 and 56 and the bevel gears 52, 54, and 55 are journally supported in a housing structure 57 which is spaced upwardly from the bale chamber 10 by means of supporting posts or the like 58 and 59. The bevel gear 50 has an outer arcuate bevel gear track 60 which is also mutilated or provided with a non-toothed portion 134 as shown in Fig. 17. A bevel gear 61 meshes with this outer gear track and carries a shaft 62, the lower end of which comprises the twister hook 48. Rotation of the gear 50 causes intermittent rotation of the rotor 47 and twister hook 48 depending upon the mutilation of the gears in the inner and outer gear tracks 51 and 60 respectively.

Figure 4:
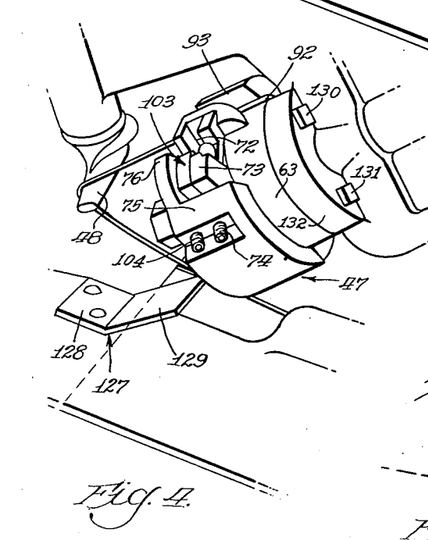
Figure 4 is a perspective view showing the strand holding rotor and twister hook.
Figure 6:
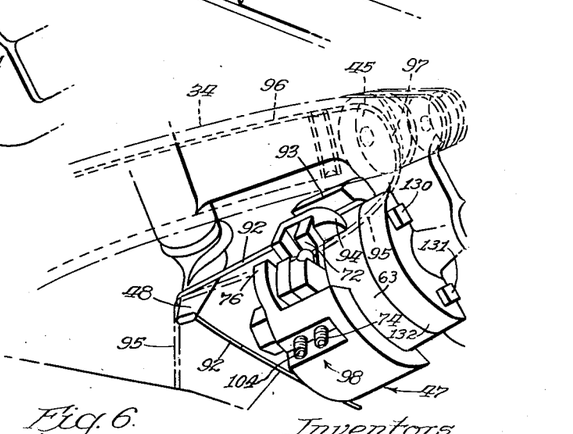
Figure 6 is a perspective view similar to Figure 4 and showing the strand carrying needle up in position over the rotor.
Figure 9:
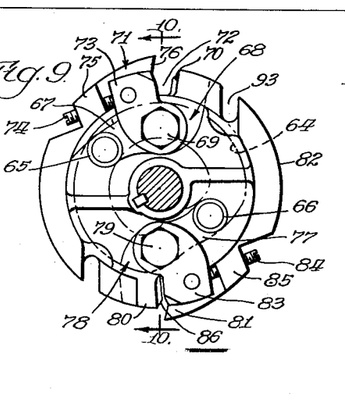
Figure 9 is a front plan view of the holding and cutting rotor.

The rotor 47 consists of a stationary portion 63 which contains an internal cam track 64. As best shown in Figs. 4, 6 and 7, the portion 63 is held stationary by means of bolt members 130 and 131 which pass through a portion 132 of the housing 57. The curvature of the cam track 64 is best shown in Figure 9. A pair of diametrically opposite rollers 65 and 66 act as cam followers and ride in the internal cam track 64 which is generally annular but for a single cammed portion and upon movement of the rollers in the cam track move radially inwardly and then outwardly dependent upon their position in the cam track 64. The roller 65 is carried on one arm 67 of a bell-crank member 68 which is pivoted at 69. An upwardly extending arm 70 comprises the remaining portion of the bell-crank 68, and in the position shown in Figure 9 the upwardly extending arm 70 is spaced apart from the movable rotor structure 71, as indicated by the space 72. The size of the opening may be slightly adjusted by movement of a member 73 toward or away from the upwardly extending arm 70 by means of an adjusting screw 74 operating through a shoulder 75 in the movable rotor structure 71. The member 73 is also hinged about the pivot 69. The rotor structure 71 is equipped with an outwardly extending point 76 adjacent the space 72 and immediately above the member 73. When the needle 34 brings a strand of tie material upwardly through the bale chamber, it deposits the strand in the space 72 in the rotor 47. The movable rotor structure 71 of the rotor 47 rotates in a clockwise direction as viewed in Figure 9 and the upwardly extending point 76 acts to guide the strand of wire or the like down into the space 72 and specifically insures that the newly laid wire will rotate with the structure 71. The roller 66 is similarly carried by an arm 77 of a bell-crank member 78 pivoted at 79. The bell-crank member 78 is equipped with an outwardly and downwardly extending arm 80 corresponding to the arm 70 of the bell-crank lever 68. The rotor structure 71 is equipped with a point 81 extending outwardly from the regular annular periphery 82 and performs the same functions as the point 76. A member 83 hinged at the pivot 79 may be adjusted toward and away from the arm 80 by means of an adjusting screw 74 supported in a shoulder 75 in the rotor structure 71. A space 86 corresponding to the space 72 is provided between the arm 80 and the member 83. In the position shown in Figure 9, the space 86 is closed by reason of the roller 66 being moved radially inwardly by the configuration of the cam track 64.

Figure 8:
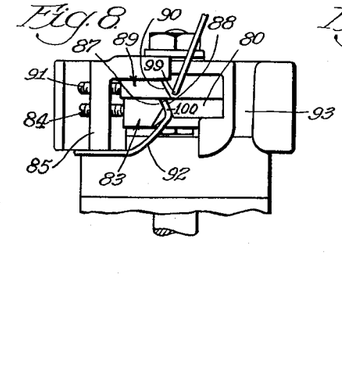
Figure 8 is a bottom plan view of the strand holding and cutting rotor.

As shown in Figure 8 the arm 80 of the bell-crank lever 78 has moved against a gripping edge 87 of the adjustable member 83. A strand of wire which was previously laid in the space or opening 86 is now securely gripped between a leading edge 88 of the bell-crank arm 80 and the gripping edge 87 of the member 83. Another member 89 is hinged on the pivot 79 and is provided with a shearing edge 90. The member 89 may be adjusted by means of an adjusting screw 91 threadedly engaging the shoulder 85. The members 83 and 89 are adjusted in such a manner that the shearing edge is positioned in advance of the gripping edge so that as the movable member 80 moves the strand of wire designated by the numeral 92, the wire is sheared as the leading edge 88 passes the shearing edge 90 of the member 89. Continued movement of the movable member 80 causes a gripping of the wire 92 between the leading edge 88 and the substantial parallel gripping edge 87 of the member 83.

Figure 5:
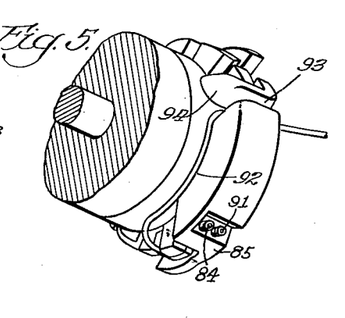
Figure 5 is a perspective view of the strand holding rotor taken substantially from the rear and having one tie strand held therein.

As best shown in Figure 5, the strand of wire 92 gripped at the bottom of the rotor 47, as shown in Figure 8, passes upwardly and around the rotor and thereupon passes through an open slot 93. The wire initially deposited in the opening or slot 86 has moved substantially 180°, and upon rotation of the rotor the wire is automatically threaded through the slot 93 by reason of a curved lip entrance which directs the wire through the slot upon rotation of the rotor. As shown in Figure 4 the strand of wire 92 extends forwardly through the slot 93 over the twister hook 48. The needle 34 carries a looped strand of wire having two ends 95 and 96 joined by an end loop 97 upwardly over the twister hook 48 and over the rotor head 47 in such a manner that the lower portion 95 of the looped strand is laid into the open slot 72 as shown in Figure 6. The strands of wire 92 and 95 are now placed adjacent each other over the twister hook 48. The upper portion 96 of the looped strand of wire is held in a spaced above position over the hook 48 by means of the needle sheave 45. The strand 96 is fed directly from the wire container 39 and as the rotor 47 rotates in the direction indicated by the arrow 98, Figure 6, the needle 34 remains in its uppermost position and a continued supply of wire is fed from the container 39, whereupon the strand which was formerly 96 winds up and around the rotor as indicated by the strand 92 in Figure 5. As the needle is retracted the strand pulls outwardly through the slot 93. The rotor 47 moves through substantially 180°, at the end of which cycle it shears and grips the strand of wire 92 as shown in Figures 8 and 9. During this 180° movement of the rotor 47 the twister hook 48 makes one revolution so that the strands of wire 92 and 95 have substantially one twist therein. As shown in Figure 7, the wire for the succeeding tie twist is gripped, as shown in Figure 8, while the twister hook 48 continues for approximately two more revolutions so that there are at least three full twists in the wires 92 and 95 at the completion of the tying operation. The one free end shown at 99 in Figure 7 is that portion of the wire sheared from the end of the clamped wire which is shown in Figure 8 and the other free end of the wire twist is that portion 100 previously gripped as shown in Figure 8 and not yet completely stripped from the rotor 47. The bale is then encircled by the strands 92 and 95 and held together by the wire twist 101 which as shown in Figure 7 has not yet been stripped from the twister hook 48.

The free ends or tails 99 and 100 tend to rotate with the twister hook 48 and thus in order to complete the twist in the tie strand the ends must be held against rotational movement. A guide bracket 127 has a flat portion 128 welded or otherwise fastened to the top of the bale forming chamber and an upwardly and forwardly inclined portion 129 which forms a crotch 130 with the top of the bale chamber through which the wire ends 99 and 100 are guided and have their rotary movement stopped.

The rotor 47, as shown in Figures 4 and 5, is equipped with a cutting edge element 103 corresponding to the element 89 shown on the underside of the rotor in Figure 8. This element is hinged on the pivot shaft 69 and is adjustable into the slot 72 by means of an adjusting screw 104 which is positioned closely adjacent the adjusting screw 74 for the member 73.

Figures 11, 12, 13, 14, 15:
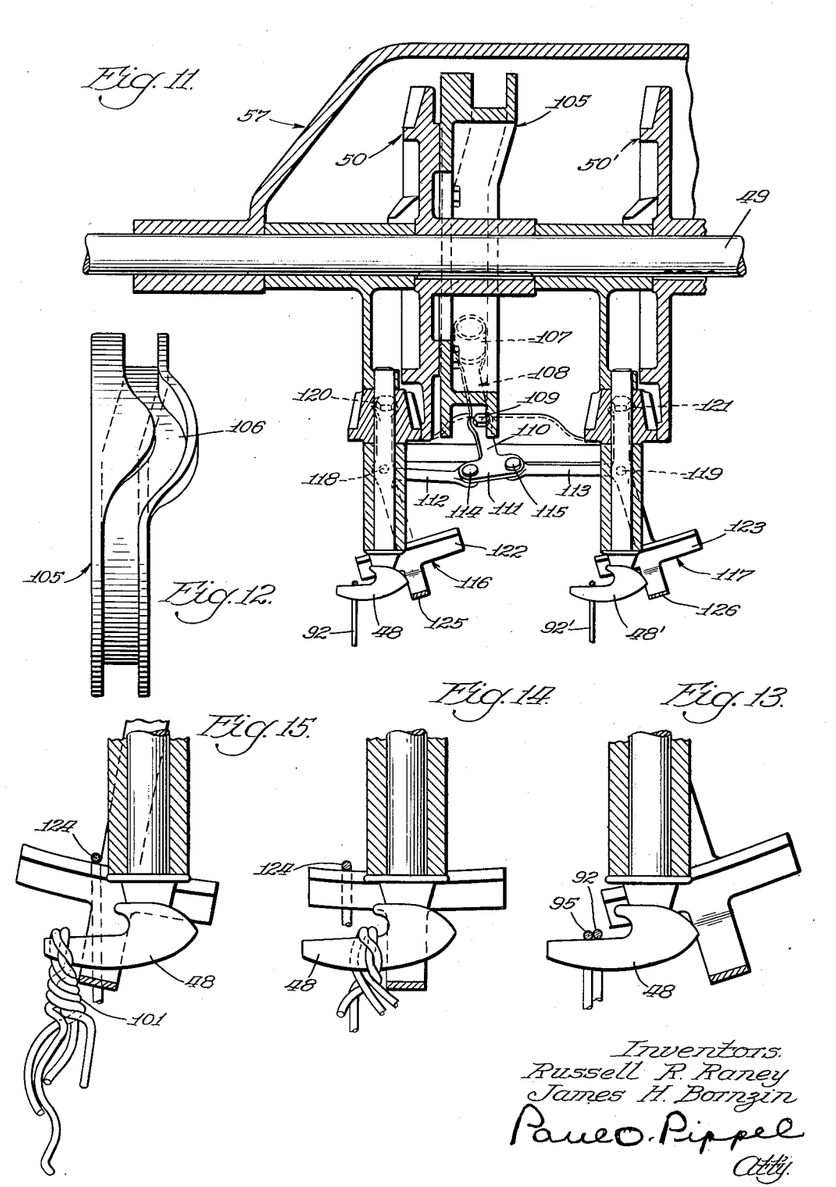
Figure 11 is a sectional view taken on the line 11—11 of Figure 3.
Figure 12 is an elevational detail of the cammed driving track as shown in Figure 11.
Figure 13 is an enlarged detail view of the twister hook showing the two strand ends thereover prior to twisting.
Figure 14 is a view similar to Figure 13 showing the strand ends partially twisted and a hold-out member in position to prevent the laying of a succeeding strand of wire onto the twister hook prior to completion of the wire twist or tie.
Figure 15 is a view similar to Figures 13 and 14 showing the completed wire twist and being stripped from the twister hook.

The bale tying mechanism of this invention provides for two looped strands of wire to encircle the bale. This is shown in greater detail in Figure 11 in which two spaced twisting heads 48 and 48' are shown. The position of the tying mechanism in Figure 11 corresponds to that shown in Figure 4 where the strands of wire 92 and 92' are placed over the twister hooks 48 and 48' respectively, prior to the encircling of the bale by the spaced needles 34. The twisting mechanism in Figure 13 corresponds to the position of the twisting mechanism as shown in Figure 6 wherein the new strand of wire 95 has been laid over the twister hook 48. Figure 14 shows the twister hook 48 after it has made one revolution and at a time when the rotor head 47 has made a 180° rotation. A closed loop is thus formed in each strand and an initial portion of a four strand twist is formed adjacent the loops. Figure 15 shows the four strand tie twist 101 upon completion similarly to that shown in Figure 7 and just prior to stripping of the twist from the twister hook.

As shown in Figure 11, the shaft 49 in addition to carrying the large bevel gears 50 and 50' carries an annularly grooved cam track 105 which is shown in detail in Figure 12. The annular track 105 has a cammed portion 106. A following roller 107 is adapted to ride in the annular cam track 105. The roller 107 is mounted on a lever arm 108 pivoted at 109 on a portion of the stationary housing structure 57. As the shaft 49 rotates, rotation is imparted to the gears 50 and 50' and also the cam track 105. The cam follower roller is moved laterally as the roller rides in the cammed portion 106 of the annular track 105. A lower extension 110 of the lever arm 108 is provided with an enlarged wide end 111 adapted to carry the ends of links 112 and 113 at 114 and 115 respectively. The connections 114 and 115 are of a pivotal nature to permit free movement of the links 112 and 113 as they are moved by action of the cam follower 107 in the cam track 105. The outer ends of the links 112 and 113 respectively join members 116 and 117 at 118 and 119. The members 116 and 117 are combination wire holdout and stripper elements. Each is hingedly mounted at its upper end at 120 and 121 and is provided at its lower end with a cross member 122 and 123. As the lever 108 is rocked about its pivot 109 the connecting links 112 and 113 are adapted to swing the members 116 and 117 about their pivots 120 and 121. The cam track 105 is arranged and positioned in such a manner as to position the cross members 122 and 123 over the twister hooks 48 and 48' after each twister hook has commenced rotation and just prior to the wire carrying needle bringing up a new strand of wire as shown in Figure 14, wherein the new strand is designated as 124 and is held in spaced above position over the twister hook 48 so as not to interfere with the tie twist of the preceding bale. Each of the members 116 and 117 is also provided with a stripping member 125 and 126 which, as shown in Figure 15, is moved to an extreme left position after the twister hook 48 has completed its full three revolutions and thus moves the tie twist 101 from the bill hook of the twister 48. Just as soon as the tie 101 from the preceding bale is removed from the hook 48, the members 116 and 117 are moved to an out of the way position by reason of the configuration of the cam track 105, permitting the newly laid wire 124 to drop down onto the twister hook 48. This sets the stage for the ensuing cycle and the tying of a newly formed bale.

Figure 16:
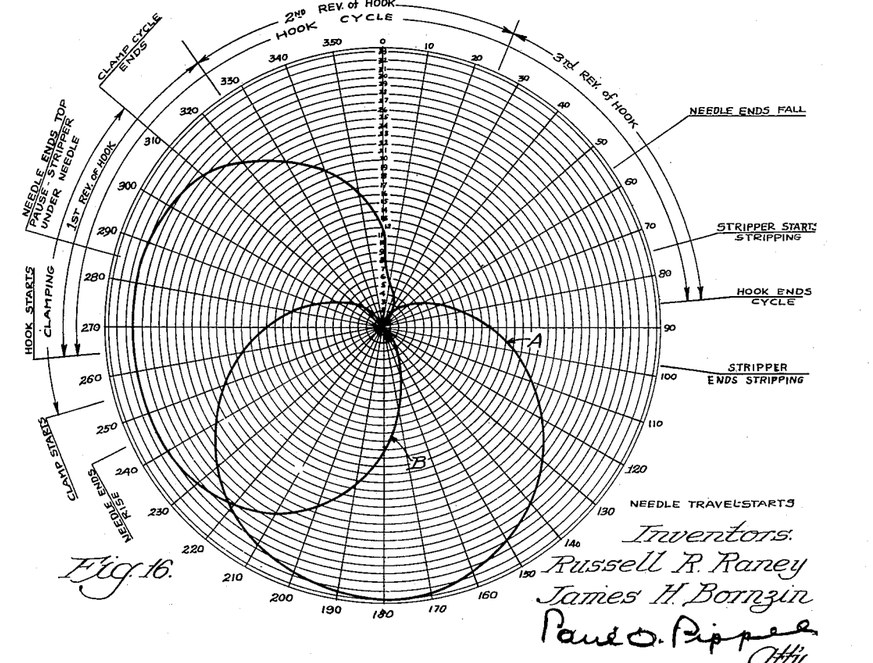
Figure 16 is a cycle chart of the various moving elements of the baler of this invention.

Figure 16 shows a graphic chart incorporating the cycles of the various moving elements in the baler. The units of measurement extending around the circumference of the chart indicate periods of time and the units of radial measurement indicate linear distances of travel of the various elements. The complete cycle includes one full reciprocation of the bale forming plunger 21 as indicated by the letter A. The needle travel is shown by the graph B. The needle commences its movement substantially 130° after the initial movement of the plunger and it is not materially moved up into the bale chamber until the plunger has substantially withdrawn. Certain of the elements do not have movement through linear distances but have a definite timed relationship with the moving bale plunger and needle, the movements of which are shown by graphs A and B. These elements are brought into the chart of Figure 16 by proper legends and arrow enclosed lines adjacent the periphery of the chart and indicative of periods of time corresponding with that period of time of the entire cycle of baler operation to which it is adjacent. The wire carrying needle reaches its substantially uppermost position at approximately 245° of baler cycle. 10° of baler cycle operation elapse after the end of the needle rise before the clamping or holding member 80 grips the wire in the rotor head 47. 10° of baler cycle operation are equal to substantially 180° rotation of the rotor head 47. Clamping of the wire occurs at approximately 255° of the baler cycle operation. While the wire is still clamped the twister hook 48 commences rotation about its own axis at approximately 265° of baler cycle operation. The wire carrying needle ends its top pause at approximately 285° of baler cycle operation and commences its downward travel. One complete twist by the twister hook 48 is completed at approximately 325° of baler cycle operation. The clamping cycle ends at 310° of baler cycle operation and thus it is evident that one of the tie wires is substantially held throughout the major portion of the first full twist of the bale tie. The twister hook continues rotation to complete the tie twist where it reaches its end at substantially 85° of the next cycle of baler operation. At 75° of the succeeding cycle of operation the stripper members 125 and 126 commence their lateral movement to move the tie twist 101 from the hooks 48 and 48'. At approximately 98° the stripper members complete their stripping operation.

Numerous details of this invention may be varied throughout a wide range without departing from the principles disclosed herein and we therefore do not propose limiting the patent granted hereon otherwise than as necessitated by the appended claims.

What is claimed is:

1. In a baler having a bale forming chamber for receiving and compressing material, said baler comprising a source of continuous tie strand positioned on one side of the bale chamber, a strand holder and cutting device on the other side of the bale forming chamber, a twister element spaced from the strand holder and cutting device on the same side of the bale forming chamber, means on said strand holder and cutting device for holding one end of the tie strand, said strand extending from its end holding position on and over the twister element and across the bale forming chamber whereby material is compressed lengthwise of said bale forming chamber against the strand extending across the bale chamber, needle means on the side of the bale forming chamber adjacent the source of tie strand for carrying a looped portion of said continuous strand across the bale forming chamber over the twister element to the strand holder and cutting device after a bale has been fully formed and the strand has been extended around two sides and one end of the bale, means in said strand holder and cutting device for receiving one part of said looped portion of said continuous strand spaced from the originally held strand end, means for rotating said twister element to initially twist the strands thereon through a predetermined angular distance, first clamping means in said strand holder and cutting device operable to release the originally held strand end, cutter means in said strand holder and cutting device for cutting the looped portion of the strand into two parts, second clamping means arranged and constructed to hold one of said strand parts for the encircling of a bale to be subsequently formed, said other parts being released, and said means for rotating said twister element arranged and constructed to continue rotation of said twister element to positively intertwist the ends of the bale encircling strand.

2. In a baler having a bale forming chamber for receiving and compressing material, said baler comprising a source of continuous tie strand positioned on one side of the bale chamber, a strand holder and cutting device on the other side of the bale forming chamber, a twister element spaced from the strand holder and cutting device on the same side of the bale forming chamber, means on said strand holder and cutting device for holding one end of the tie strand, said strand extending from its end holding position on and over the twister element and across the bale forming chamber whereby material is compressed lengthwise of said bale forming chamber against the strand extending across the bale chamber, needle means on the side of the bale forming chamber adjacent the source of tie strand for carrying a looped portion of said continuous strand across the bale forming chamber over the twister element to the strand holder and cutting device after a bale has been fully formed and the strand has been extended around two sides and one end of the bale, means in said strand holder and cutting device for receiving one part of said looped portion of said continuous strand spaced from the originally held strand end, means for rotating said twister element to initially twist the strands thereon through a predetermined angular distance, first clamping means in said strand holder and cutting device operable to release the originally held strand end, cutting means in said strand holder and cutting device for cutting the looped portion of the strand into two parts, second clamping means in said strand holder and cutting device operable to hold one of said parts for the encircling of a bale to be subsequently formed, said other part being released, said means for rotating said twister element arranged and constructed to continue rotation of said twister element to positively intertwist the ends of the bale encircling strand, a twist stripping element, and means operable to move said stripping element across said twister element upon the completion of the rotation of said twister element.

3. In a baler having a bale forming chamber for receiving and compressing material, said baler comprising a source of continuous tie strand positioned on one side of the bale chamber, a strand holder and cutting device on the other side of the bale forming chamber, a twister element spaced from the strand holder and cutting device on the same side of the bale forming chamber, means on said strand holder and cutting device for holding one end of the tie strand, said strand extending from its end holding position on and over the twister element and across the bale forming chamber whereby material is compressed lengthwise of said bale forming chamber against the strand extending across the bale chamber, needle means on the side of the bale forming chamber adjacent the source of tie strand for carrying a looped portion of said continuous strand across the bale forming chamber over the twister element to the strand holder and cutting device after a bale has been fully formed and the strand has been extended around two sides and one end of the bale, means in said strand holder and cutting device for receiving one part of said looped portion of said continuous strand spaced from the originally held strand end, means for rotating said twister element to initially twist the strands thereon through a predetermined angular distance, first clamping means in said strand holder and cutting device operable to release the originally held strand end, cutting means in said strand holder and cutting device for cutting the looped portion of the strand into two parts, second clamping means operable to hold one of said parts for the encircling of a bale to be subsequently formed, said other parts being released, said means for rotating said twister element arranged and constructed to continue rotation of said twister element to positively intertwist the ends of the bale encircling strand, a strand holdout member, and means operable to move said holdout member to a position spaced over said twister element during the completion of rotation of the twister element whereby when the needle means is retracted to its original side the part of the looped strand held is carried over the holdout member and out of contact with the twister element.

4. In a baler having a bale forming chamber for receiving and compressing material, said baler comprising a source of continuous tie strand positioned on one side of the bale chamber, a strand holder and cutting device on the other side of the bale forming chamber, a twister element spaced from the strand holder and cutting device on the same side of the bale forming chamber, means on said strand holder and cutting device for holding one end of the tie strand, said strand extending from its end holding position on and over the twister element and across the bale forming chamber whereby material is compressed lengthwise of said bale forming chamber against the strand extending across the bale chamber, needle means on the side of the bale forming chamber adjacent the source of tie strand for carrying a looped portion of said continuous strand across the bale forming chamber over the twister element to the strand holder and cutting device after a bale has been fully formed and the strand has been extended around two sides and one end of the bale, means in said strand holder and cutting device for receiving one part of said looped portion of said continuous strand spaced from the originally held strand end, means for rotating said twister element to twist the strands thereon through a predetermined angular distance, forming thereby a closed loop in each strand and a four strand twist adjacent the loop, and means for subsequently operating the strand holder and cutting device to effect release of the originally held strand and cutting the looped portion of the continuous strand.

5. In a baler having a bale forming chamber for receiving and compressing material, said baler comprising a source of continuous tie strand positioned on one side of the bale chamber, a strand holder and cutting device on the other side of the bale forming chamber, a twister element spaced from the strand holder and cutting device on the same side of the bale forming chamber, means on said strand holder and cutting device for holding one end of the tie strand, said strand extending from its end holding position on and over the twister element and across the bale forming chamber whereby material is compressed lengthwise of said bale forming chamber against the strand extending across the bale chamber, needle means on the side of the bale forming chamber adjacent the source of tie strand for carrying a looped portion of said continuous strand across the bale forming chamber over the twister element to the strand holder and cutting device after a bale has been fully formed and the strand has been extended around two sides and one end of the bale, means in said strand holder and cutting device for receiving one part of said looped portion of said continuous strand spaced from the originally held strand end, means for rotating said twister element to initially twist the strands thereon through a predetermined angular distance, forming thereby a closed loop in each strand and an initial portion of a four strand twist adjacent the loops, means for subsequently operating the strand holder and cutting device to effect release of the originally held strand and cutting of the looped portion of the continuous strand, and said means for rotating the twister element thereafter further rotating the twister element to additionally twist the four strands.

6. In a self-tying baler, a strand handling device comprising a stationary part having an internal generally annular track with a cammed portion, a rotor mounted for rotational movement adjacent said stationary part, said rotor having a notch in the periphery thereof, a bell crank member pivotally mounted on said rotor and positioned between the rotor and stationary part, said bell crank member having two angularly disposed arms, and a cam follower on one of said bell crank member arms adapted to engage the annular track in the stationary part, the other arm of said bell crank member extending outwardly and being formed and positioned with respect to a portion of the rotor adjacent the notch to provide shear type cutting means, and being further provided with means cooperating with a portion of the rotor adjacent the notch to form a holding means for one end of a strand severed by the cutting means, said cammed portion arranged and constructed to move the outwardly extending bell crank arm across the notch to operate the cutting means and the holding means.

7. In a self-tying baler, a strand handling device comprising a stationary member having an internal generally annular track with a single cam portion, a rotor member mounted for rotational movement adjacent said stationary member, said rotor member having diametrically opposed notches in the periphery thereof, a bell crank member pivotally mounted on said rotor and positioned between the rotor and stationary members, said bell crank member having two angularly disposed arms, a cam follower on one of said bell crank member arms adapted to engage the annular track in the stationary member, the other arm of said bell crank member extending outwardly and being formed and positioned with respect to a portion of the rotor member adjacent one notch to provide shear type cutting means, and being further provided with means cooperating with a portion of the rotor adjacent the notch to form a holding means for one end of a strand severed by the cutting means, a second bell crank member pivotally mounted on said rotor member and positioned between the rotor and stationary members, said second bell crank member having two angularly disposed arms, and a cam follower on one of said second bell crank member arms adapted to engage the annular track at a position spaced substantially diametrically opposite the cam follower on the first of said bell crank members, the other arm of said second bell crank member extending outwardly and being formed and positioned with respect to a portion of the rotor adjacent the other notch to provide shear type cutting means, and being further provided with means cooperating with a portion of the rotor adjacent the notch to form a holding means for one end of a strand severed by the cutting means, said cammed portion arranged and constructed to move the outwardly extending arm of the first bell crank member across the one notch during the first half revolution of the rotor member to operate the cutting means and the holding means and to retract that arm and move the outwardly extending arm of the second bell crank member across the other of said notches during the second half revolution of the rotor member to operate the cutting means and the holding means.

8. In a self-tying baler, a strand handling device comprising a stationary member having an internal generally annular track with a single cam portion, a rotor member mounted for rotational movement adjacent said stationary member, said rotor member having diametrically opposed pairs of closely spaced notches in the periphery thereof, a bell crank member pivotally mounted on said rotor and positioned between the rotor and stationary members, said bell crank member having two angularly disposed arms, a cam follower on one of said bell crank member arms adapted to engage the annular track in the stationary member, the other arm of said bell crank member extending outwardly and being formed and positioned with respect to a portion of the rotor member adjacent one notch of a first pair to provide shear type cutting means, and being further provided with means cooperating with a portion of the rotor adjacent that notch to form a holding means for one end of a strand severed by the cutting means, a second bell crank member pivotally mounted on said rotor member and positioned between the rotor and stationary members, said second bell crank member having two angularly disposed arms, and a cam follower on one of said second bell crank member arms adapted to engage the annular track at a position spaced substantially diametrically opposite the cam follower on the first of said bell crank members, the other arm of said second bell crank member extending outwardly and being formed and positioned with respect to a portion of the rotor adjacent the notch in the second of said pairs of notches diametrically opposite the notch having the outwardly extending arm of the first bell crank member adjacent thereto to provide shear type cutting means, and being further provided with means cooperating with a portion of the rotor adjacent the notch to form a holding means for one end of a strand severed by the cutting means, said cammed portion arranged and constructed to move the outwardly extending arm of the first bell crank member across the one notch during the first half revolution of the rotor member to operate the cutting means and the holding means to hold a strand end during the retraction of the strand and positioning it around the periphery of the rotor and into one of the closely spaced notches, and to retract that arm and move the outwardly extending arm of the second bell crank member across the other of said notches during the second half revolution of the rotor member to operate the cutting means and the holding means.

RUSSELL R. RANEY.
JAMES H. BORNZIN.

REFERENCES CITED

The following references are of record in the file of this patent:

UNITED STATES PATENTS

| Number | Name | Date |
|---|---|---|
| 1,257,465 | Dudley | Feb. 26, 1918 |
| 1,534,359 | Collins | Apr. 21, 1925 |
| 1,590,319 | Robbins | June 29, 1926 |
| 2,413,378 | Raney | Dec. 31, 1946 |